May 6, 1958 M. K. LORSCHEIDT ET AL 2,833,258
VALVE MECHANISM FOR INTERNAL COMBUSTION ENGINES
Filed April 11, 1956
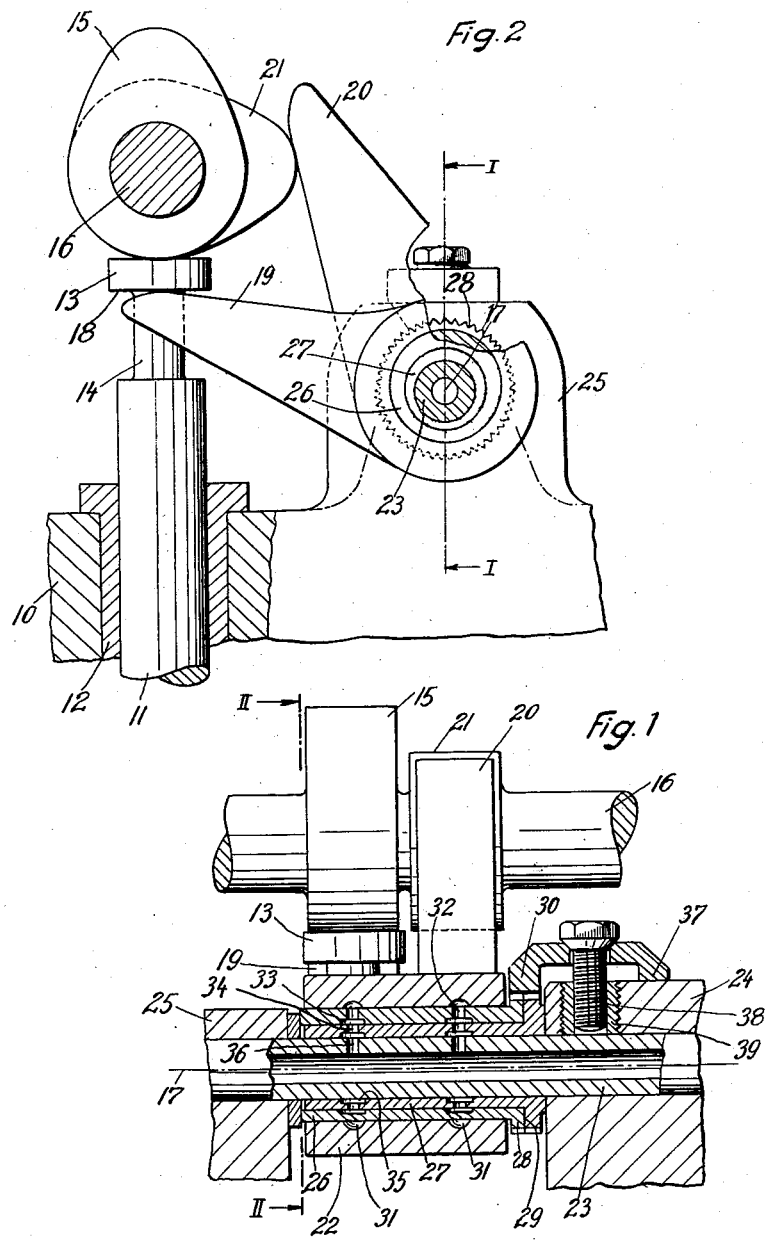
Inventors
MANFRED K. LORSCHEIDT
AND HANS MEYER
BY Dicke and Cray
ATTORNEYS.

2,833,258

VALVE MECHANISM FOR INTERNAL COMBUSTION ENGINES

Manfred K. Lorscheidt, Stuttgart-Unterturkheim, and Hans Meyer, Stuttgart, Germany, assignors to Daimler-Benz Aktiengesellschaft, Stuttgart-Unterturkheim, Germany Application April 11, 1956, Serial No. 577,558

Claims priority, application Germany April 28, 1955

7 Claims. (Cl. 123—90)

Our invention relates to a valve mechanism for internal combustion engines, and more particularly, to improved means for mounting a lever acting on the valve stem in the closing direction.

It is an object of the present invention to provide simple means for adjusting the fulcrum axis of the valve actuating lever in any desired direction thereby permitting to reduce the backlash or lost motion in the valve actuation to a minimum, such means comprising the smallest possible number of parts capable of manufacture at low cost and of simple assembly and disassembly and adjustment.

Further objects of the present invention will appear from a detailed description following hereinafter of a preferred embodiment thereof with reference to the accompanying drawings. It is to be understood, however, that the terms and phrases used in such description have been chosen for the purpose of illustrating the invention rather than that of restricting or limiting it.

In the drawings—

Fig. 1 is a sectional elevation of a valve actuating mechanism for an internal combustion engine, partly in section taken along the line I—I of Fig. 2, and Fig. 2 is a side view partly in section along the line II—II of Fig. 1.

The cylinder head 10 of an internal combustion engine includes the conventional inlet ducts and outlet ducts, each controlled by a poppet valve composed of a valve head (not shown) and of an upright valve stem 11 slidably guided in a bushing 12 inserted in the cylinder head 10 and projecting therefrom upwardly to establish contact of a head 13 provided on the upper reduced end 14 of the stem with a cam 15 of a horizontal cam shaft 16. This shaft is preferably coordinated to all of the valves and, therefore, carries a plurality of cams, such as 15, serving to exert a downwardly directed force upon the valves for accelerating the same in the initial phase of the opening movement and for decelerating the same in the end phase of the closing movement of the valve.

In lieu of the conventional valve spring, there is provided a bell crank fulcrumed for rotation about a horizontal axis 17 extending parallel to the cam shaft 16 and disposed at a lower level than the same and in spaced relationship to the valve stem 11. The bell crank has a bifurcated arm 19 straddling the reduced end 14 of the valve stem and engaging the shoulder 18 formed by the bottom face of the head 13 of the valve stem 11 to thereby exert an upwardly directed force upon the valve. Moreover, the bell crank has another arm 20 engaging a second cam 21 formed integral with the cam shaft 16 adjacent cam 15. Both arms 19 and 20 project from a common hub 22 which is carried by a horizontal pivot pin 23 through the intermediary of suitable adjusting means to be described later. The pivot pin 23, which is preferably hollow and constitutes a conduit for a lubricant, is fixed to and carried by spaced brackets 24 and 25 which project upwardly from the cylinder head 10 and may be bolted thereto or integral therewith.

It is desirable to maintain the backlash or lost motion between the cams 15 and 21, the bell crank 19, 20, 22 and the valve stem 11 at a minimum. As the valve head, however, is subject to wear and deformation after operation of the engine over an extended period of time, it is necessary to provide such adjusting means as to permit of a simple and effective readjustment of the position of the bell crank 19, 20, 22 relative to the elements 21 and 13 cooperating therewith.

More particularly, it is desirable, that such adjusting means permit of a displacement of the axis 17 upwardly or downwardly or to the right or to the left with reference to Fig. 2 or any other desired direction within certain limits.

For the purpose of such adjustment the following mechanism is provided: Between the pivot pin 23 and the hub 22 of the bell crank, a pair of relatively rotatable sleeves 26 and 27 is interposed in nested relationship. The cylindrical faces on the inside and on the outside of each sleeve 26, or 27 respectively, are eccentrically disposed relative to each other. Preferably, though not necessarily, the amount of eccentricity is the same for both sleeves.

Each sleeve has an end flange 28, and 29 respectively, and a detent member 30 engages both of such flanges for retaining the same in the adjusted angular position. The outer sleeve 26 constitutes a bearing for the hub 22 and preferably consists of a suitable material, such as bronze. The internal face of the hub 22 may be provided with annular lubricating grooves 31 communicating with radial bores 32 of the sleeve 26, such bores communicating with annular grooves 33 provided on the inner face of sleeve 26. The grooves 33 register with radial bores 34 of the sleeve 27. These radial bores 34 communicate with annular grooves 35 provided on the inner face of sleeve 27 in registry with radial bores 36 of the pivot pin 23. Therefore, a lubricant under pressure supplied to the internal bore 23 will have access through the bores 36, grooves 35, bores 34, grooves 33, and bores 32 to the lubricating grooves 31.

Preferably, the end flanges 28 and 29 are integral with the sleeves 26, and 27 respectively, and are disposed one beside the other between the bracket 24 and the hub 22. The substantially circular peripheries of the flanges 28 and 29 are preferably serrated or toothed and disposed coaxially to the contacting faces of the sleeves 26 and 27. As a result, the periphery of flange 28 will remain in axial registry with the periphery of flange 29 in any adjusted relative angular position of the two sleeves 26 and 27 whereby full engagement of both flanges 28 and 29 with the common detent member 30 is ensured.

The detent member 30 is preferably bridge-shaped having a base portion engaging both of the flanges 28 and 29 and having another base portion 37 engaging a suitable support, such as the bracket 24. Preferably, the bottom face of the portion 37 contacting the plane top of the bracket 24 is slightly convex. In the embodiment shown, the means for releasably securing the detent member 30 to the bracket 24 comprises a headed screw 38 having threaded engagement with a bushing 39 inserted in a bore of and fixed to the bracket 24.

The cooperating faces of the head of screw 38 and of the detent member 30 are preferably spherical.

If the necessity arises of adjusting the axis 17 in any desired direction, the screw 38 must be loosened sufficiently to permit disengagement of the serrated detent member 30 from the toothed flanges 28 and 29. Thereupon the sleeve 26 or the sleeve 27 or both may be turned by means of suitable tools acting on the serrated flanges. Such adjustment cannot disturb the coaxial disposition of the serrated peripheries of the flanges 28 and 29 although the axis of such peripheries, being slightly offset from the axis 17, will be displaced upwardly or downwardly or to the right or to the left depending on the angular disposition and adjustment of the inner sleeve 27. Such displacement, however, will not interfere with proper engagement of the detent member 30 with the flanges when the screw 38 is tightened again. No jamming of the detent member 30 will occur because any angular displacement of the detent member will be properly taken up by the contacting spherical faces of the detent member and the screw. Where the amount of eccentricity is the same for both sleeves 26 and 27, the boundary within which the axis 17 may be adjusted to any desired position parallel to the cam shaft 16 is a cylinder having a radius amounting to twice the amount of eccentricity of either sleeve.

Hence it is also possible, for instance, to adjust the axis 17 substantially along an arc of a circle extending about the axis of the cam shaft 16 to thereby vary the phase relationship of the actuations of the valve stem by the two cams whereby valve stem clearance in the open valve condition may be adjusted independently from the clearance in the closed valve condition.

The detent member 30 can be mass-produced at low cost by producing a cylindrical tubular member having internal end flanges resulting in a profile, such as that of member 30 shown in Fig. 1, by cutting internal teeth in one of the flanges and by subsequently cutting up the tubular member by radial cuts into six segments, each segment constituting a detent member, such as 30.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. In an internal combustion engine, the combination comprising a valve having a stem provided with a shoulder, a cam shaft having a pair of cams, one of said cams being cooperatively associated with said stem to accelerate said valve in the opening direction, a bell crank having a hub and a pair of arms extending therefrom, one arm being cooperatively associated with the other one of said cams, the other arm engaging said shoulder to accelerate said valve in the closing direction, a pivot pin carrying said bell crank, and means for adjusting the axis of rotation of said bell crank in any desired direction, said means including a pair of relatively rotatable sleeves interposed in nested relationship between said pivot pin and said hub, each sleeve having relatively eccentric cylindrical faces on the inside and on the outside and an end flange, a detent member engaging both of said flanges, and means for releasably securing said detent member.

2. In an internal combustion engine, the combination comprising a valve having a stem provided with a shoulder, a cam shaft having a pair of cams, one of said cams being cooperatively associated with said stem to accelerate said valve in the opening direction, a bell crank having a hub and a pair of arms extending therefrom, one arm being cooperatively associated with the other one of said cams, the other arm engaging said shoulder to accelerate said valve in the closing direction, a pivot pin carrying said bell crank, and means for adjusting the axis of rotation of said bell crank in any desired direction, said means including a pair of relatively rotatable sleeves interposed in nested relationship between said pivot pin and said hub, each sleeve having relatively eccentric cylindrical faces on the inside and on the outside and an end flange, the end flanges of said sleeves being disposed one adjacent the other and having toothed circular peripheral faces coaxial to the contacting ones of said faces, a detent member engaging both of said flanges, and means for releasably securing said detent member.

3. The combination as claimed in claim 2 in which said sleeve is integral with said end flange.

4. The combination as claimed in claim 2 in which the amount of eccentricity of said relatively eccentric cylindrical faces on the inside and on the outside is substantially the same for both of said sleeves.

5. The combination as claimed in claim 1 further comprising a support engaged by said means for releasably securing said detent member and carrying said pivot pin, said hub being rotatable on the outer one of said pair of sleeves.

6. The combination as claimed in claim 5 in which said detent member has a portion engaging both of said flanges and another portion having a convex face engaging said support, said means for releasably securing said member being formed by a threaded bolt extending through said detent member and having threaded engagement with said support.

7. In an internal combustion engine, the combination comprising a valve having a stem provided with a shoulder, a cam shaft having a pair of cams, one of said cams being cooperatively associated with said stem to accelerate said valve in the opening direction thereof, a bell crank having a hub and a pair of arms extending therefrom, one arm being cooperatively associated with the other one of said cams, the other arm engaging said shoulder to accelerate said valve in the closing direction thereof, a pivot pin carrying said bell crank, and means for adjusting the axis of rotation of said bell crank in any desired direction, said means including a pair of relatively rotatable sleeves interposed in nested relationship between said pivot pin and said hub, each sleeve having relatively eccentric cylindrical faces on the inside and on the outside thereof, and means for releasably securing said sleeves.

References Cited in the file of this patent

UNITED STATES PATENTS

| 1,227,812 | MacPherson | May 29, 1917 |
| 1,633,882 | Ballot | June 28, 1927 |
| 2,401,480 | Halliday | June 4, 1946 |